United States Patent

[11] 3,596,528

[72] Inventors Otto Dittrich;
 Herbert Kirchner, bad Homburg Vor Der Hohe, Germany
[21] Appl. No. 887,048
[22] Filed Dec. 22, 1969
[45] Patented Aug. 3, 1971
[73] Assignee Reimers Getriebe A. G.
 Zug, Switzerland
[32] Priority Dec. 24, 1968
[33] Germany
[31] P 18 16 949.8

[54] INFINITELY VARIABLE CONE PULLEY TRANSMISSION
14 Claims, 12 Drawing Figs.
[52] U.S. Cl. .................................................. 74/230.17F,
 74/230.17 (M), 74/865
[51] Int. Cl. ................................................... F16h 55/22,
 B60k 21/10
[50] Field of Search ............................................. 74/865,
 230.17 F, 230.17 M

[56] References Cited
UNITED STATES PATENTS
| | | | |
|---|---|---|---|
| 3,052,132 | 9/1962 | Dittrich et al. | 74/230.17 (F) |
| 3,395,586 | 8/1968 | Kirchner | 74/230.17 (F) |
| 3,368,426 | 2/1968 | Karig et al. | 44/865 |

Primary Examiner—Leonard H. Gerin
Attorney—Jennings Bailey, Jr.

ABSTRACT: A fully hydraulic control mechanism for an infinitely variable cone pulley transmission in which the axially movable conical disc of each pulley is pressed against an endless belt or chain running between the pulleys with a different contact pressure than the corresponding disc of the other pulley. The control mechanism acts at the same time upon the axially movable discs on the driving and driven shafts of the transmission, and the contact pressure of all discs is load-responsive as well as speed-ratio progressive.

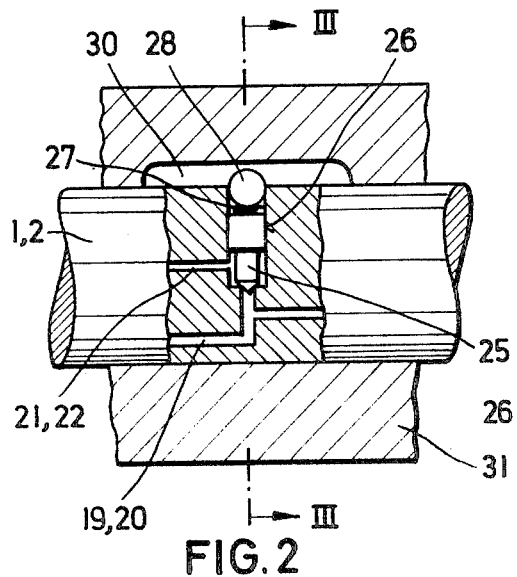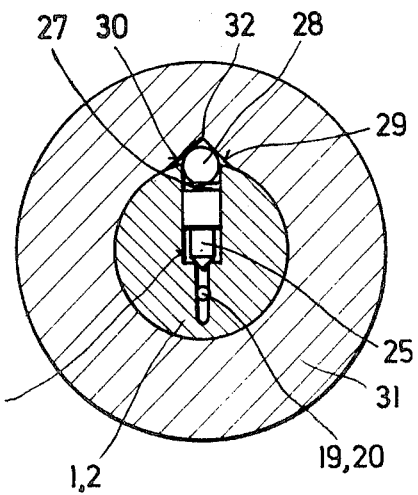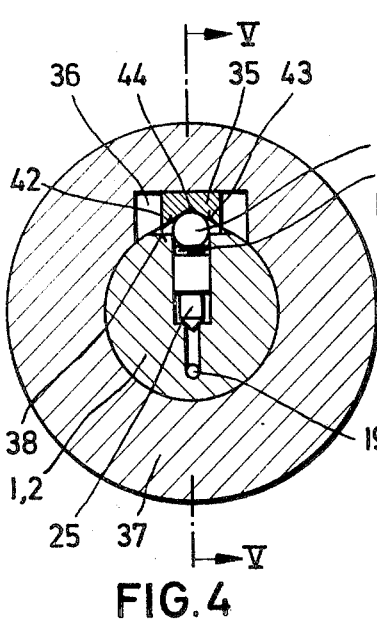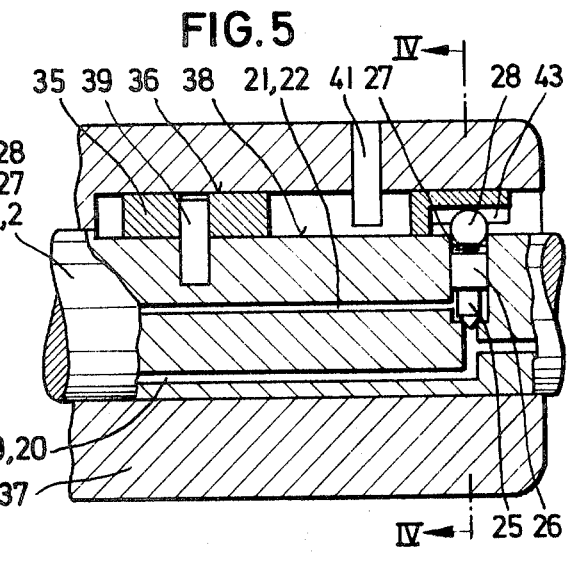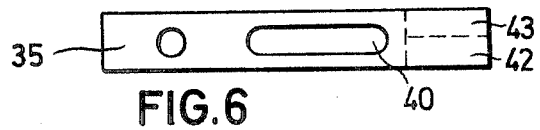

INFINITELY VARIABLE CONE PULLEY TRANSMISSION

BACKGROUND OF THE INVENTION

1. Field of the Invention

The present invention relates to an infinitely variable cone pulley transmission which comprises associated pairs of conical disks on the driving and drive sides of the transmission, and an endless transmitting element such as a belt or chain running between the two pairs of conical disks. One disk of each pair is slidable in the axial direction on its shaft relative to the other disk and is designed so as to form a rotatable hydraulic cylinder containing a piston which is rigidly connected to this shaft. These conical disks at both sides of the transmission are pressed against the transmitting element with contact pressures which solely depend upon the hydraulic pressure in the cylinders which is produced automatically in a manner so as to be directly responsive to the load which is exerted upon the transmission. This transmission further comprises a control element for maintaining and varying the speed ratio of the transmission, and a distributing slide valve which is acted upon by the control element and adapted to receive a pressure fluid such as oil from a suitable source under pressure and to distribute this pressure fluid to the hydraulic cylinders.

2. The Prior Art

In a transmission of this known type, as disclosed by the U.S. Pat. No. 3,451,283 and the copending British application No. 36,680/67, the slide valve is provided with four control edges and the control element consists of a control lever which is pivotably connected to the slide valve and permits the latter to be arbitrarily adjusted, for example, by hand for varying the speed ratio of the transmission and also to be adjusted by one of the axially slidable conical disks in proportion to the distance of its axial movements. For this purpose, one end of the control lever is connected to an actuating element for effecting the manual adjustments, while its other end engages into a peripheral groove in the outer surface of the axially slidable conical disk.

While such a control element is very suitable especially when the drive unit is of a type which rotates at a constant speed or when the transmission should always run at a certain speed ratio, it is advisable to employ a control element of a different construction if the power output and the speed of the drive unit, for example, a carburetor engine, are variable. Such a control element as disclosed, for example, by the French Pat. No. 1,425,189 in connection with an infinitely variable cone pulley transmission in which the contact pressures of the conical disks at the driving and driven sides of the transmission are produced solely by mechanical means, consists of an output control lever for the drive unit which acts upon a governor which determines the speed ratio of the transmission and is, in turn, controlled by the variable driving speed of the drive unit.

A transmission of the type as first described above is further provided with a control biasing driven side which is inserted into the return line of the pressure fluid which flows through this line under the hydraulic pressure prevailing at the driven side of the transmission. The initial tension of this biasing valve is variable in response to the hydraulic pressure prevailing at the driving side of the transmission. If in such a transmission the load is increased, for example, on its driven side, this has the effect, in view of the general law of such transmissions, that the transmitting element always exerts a greater spreading force upon the driving disks than upon the driven disks, that the conical disk which is axially slidable at the driven side yields under the spreading force of the transmitting element because the hydraulically produced contact pressure of this disk against the transmitting element is insufficient to balance this spreading force. At the same time, the axially slidable conical disk at the driven side of the transmission moves in the direction toward the transmitting element and the speed ratio of the transmission is therefore changed so that its driven shaft will run at a lower speed. This operation has the result that by the action of the control lever and the slide valve with four control edges which is pivotably connected thereto the hydraulic pressure will be increased at the driving side of the transmission. This increased hydraulic pressure at the driving side further causes by means of the biasing valve an increase of the hydraulic pressure at the driven side and thus at the same time an increase of the pressure ratio at both sides of the transmission. This transient pressure variation comes to a stop when the slide valve is in a position in which in operative association with the biasing valve the contact pressures which are exerted by the two pairs of conical disks upon the transmitting element are in a state of balance with the spreading forces which are exerted by the transmitting element upon these disks.

These adjusting operations proceed, however, in the reverse direction when the load upon the driven side of the transmission decreases and thus also the torque which is to be transmitted by the transmission. All of these adjusting proceedings have, however, in common that an increase or decrease of the hydraulic pressure at the driven side of the transmission by means of the biasing valve can always occur only when a corresponding increase or decrease of the hydraulic pressure has already occurred at the driving side as the result of the adjustment of the slide valve. Stated in different words, this means that a variation of the torque which is conducted through the transmission cannot simultaneously exert any influence upon the height of the hydraulic pressure at the driving and driven sides of the transmission so as to effect a very quick adjustment of the latter to the new load conditions. This leads to a certain sluggishness of the known types of hydraulic contact-pressure producing systems which is especially of disadvantage if the changes in the torque occur frequently of in quick succession.

It is further one of the laws of infinitely variable cone pulley transmissions that the ratio between the contact pressures on the driving and driven sides of such a transmission changes within certain limits in response to the particular load upon the transmission and to the particular speed ratio thereof. If, for example, the driving speed of the drive unit is constant and a certain power is to be transmitted by the transmission, this change has the effect that at a variation of the speed ratio of the transmission the ratio of the spreading force decreases which is exerted by the transmitting element upon the conical disks at the driving and driven sides so that the driven shaft of the transmission increases in speed.

Therefore, as disclosed, for example, by the German Pat. No. 1,081,733, the known transmissions in which the contact pressures are produced at least partly mechanically have been provided with a number of very complicated mechanical pressure-producing means for producing contact pressures which are not only responsive to the load upon the transmission but also to the particular speed ratio thereof. However, for transmissions of the type as referred to at the beginning, in which the contact pressures of the conical disks upon the transmitting element are produced only hydraulically, there has so far been no disclosure of any possibility which would permit the ratio between the contact pressures on the driving and driven sides of the transmission to be also responsive to a change of its speed ratio. Although in most cases it is sufficient to operate such a transmission with contact pressures which are merely dependent upon the particular load acting upon the transmission, very high-grade transmissions, for example, motor vehicle transmissions, which should take up the smallest possible space and be able to transmit very high powers must be designed so as also to be responsive to changes in the speed ratio and to insure that at any speed ratio the contact pressures of the conical disks upon the endless transmitting element will just be high enough so as to prevent the transmitting element from slipping since such slipping would wear out the transmitting element and the conical disks very severely and render the entire transmission useless very prematurely.

SUMMARY OF THE INVENTION

It is the principal object of the present invention to provide an infinitely variable cone pulley transmission in which the contact pressures for applying the conical disks of the driving and driven sides of the transmission against the endless transmitting element are produced fully hydraulically, and which overcomes the disadvantages of this type of transmission as previously disclosed. The transmission according to the present invention is therefore to be designed so that the contact pressures of the conical disks at the driving and driven sides of the transmission will be produced and controlled so as to adjust themselves automatically not only in accordance with the changing loads to which the transmission is subjected but also in accordance with and responsive to the varying speed ratio to which the transmission is adjusted. The transmission according to the invention is further to be designed so as to take the fact in consideration that between the lowest and highest speed ratios to which a transmission of this general type is adjustable, there is always at least one speed ratio which requires particularly a high contact pressure of the conical disks upon the transmitting element. If the contact pressure would be made of such a strength that at this particular speed ratio it would just prevent the transmitting element from slipping relative to the conical disks, this contact pressure would be unnecessarily excessive at the other speed-ratio adjustments. Such excessive contact pressures would, of course, mean excessive loads upon the transmission which would result in undue wear and tear and would reduce the useful life of the transmission considerably. It is therefore another object of the invention to design the transmission so that the contact pressures will have the proper strength so as just to prevent the transmitting element from slipping at any speed ratio to which the transmission is adjustable. A further object of the invention is to produce and control the hydraulic contact pressures with which the conical disks at the driven side of the transmission are pressed against the transmitting element in such a manner that these contact pressures will no longer be dependent upon the strength of the hydraulic pressures which act upon the conical disks at the driving side of the transmission. Finally, it is an object of the invention to design the transmission in a manner so as to require much more simple and inexpensive means for attaining the above-mentioned objects than were required in previous transmissions in which the contact pressures were produced at least partly by mechanical means.

For attaining these objects, the present invention provides an infinitely variable cone pulley transmission of the type as first referred to herein, which, however, is provided on the driving side and/or on the driven side of the transmission with a pressure control valve which is mechanically adjustable by the action of the respective torque to be transmitted and also in response to the varying axial positions of the slidable conical disk and is adapted to determine the required hydraulic pressure so as to be load-responsive as well as responsive to the particular speed ratio to which the transmission is adjusted. This pressure control valve may always be acted upon by a compression spring so as to insure that a certain basic pressure will also be maintained when the transmission is not in operation or not running under a load.

One feature of a preferred embodiment of the invention consists in providing the shaft on which the slidable disk in the form of a hydraulic cylinder is mounted with a bore or channel which extends through the shaft parallel to the axis thereof and leads to the hydraulic cylinder for supplying the pressure fluid thereto, and in providing the shaft with an additional channel which is connected to the first channel which leads to the pressure control valve which is mounted in this shaft, and leads from this pressure control valve to the outside. Another feature of the invention consists in providing the pressure control valve with a movable intermediate element which by means of the compression spring of this valve partly projects radially toward the outside of the shaft and presses against an inclined cam surface which extends substantially parallel to the axis of the shaft and is provided in the wall of the bore of the hub of the axially slidable conical disk. By means of this inclined surface acting through the intermediate element and the compression spring upon the pressure control valve, the latter may be acted upon in response to the load to which the respective side of the transmission is subjected. For also acting upon the pressure control valve in response to the speed ratio to which the transmission is adjusted, the mentioned inclined surface in the hub of the slidable conical disk varies in inclination in its longitudinal direction.

According to a still more preferred embodiment of the invention, in which the shaft carrying the slidable disk in the form of a hydraulic cylinder is likewise provided with the mentioned channels and a pressure control valve as described, and in which the intermediate element likewise engages upon an inclined surface in the hub of the slidable disk so that the pressure control valve will be acted upon in response to the load to which this side of the transmission is subjected, this inclined surface is provided on a lever which is pivotably mounted in a recess in the wall of the bore of the hub and extending parallel to the axis of the shaft. This lever engages with a surface of the shaft which extends parallel to its axis. It is pivotable about a pin which is mounted in a radial bore of the shaft, and is provided with a longitudinal slot into which a pin projects in the radial direction from the wall of the hub.

In view of the possible cases in which both of these embodiments of the invention may be applied, the movable intermediate element may be located between two of the inclined surfaces both of which extend substantially parallel to the axis of the shaft and extend at the same angle of inclination to a radial plane projecting from the shaft which intersects the vertex between these two surfaces which extends parallel to the axis of the shaft. These two inclined surfaces between which the intermediate element is located may, however, also be disposed at different angles of inclination to the radial plane which projects from the shaft, and the intermediate element preferably consists of a ball which engages at one side upon the compression spring which acts upon the pressure control valve and at the opposite side either with one or the other or both inclined surfaces depending upon the particular operating conditions of the transmission.

By means of the different embodiments of the transmission according to the invention it is possible to produce the best possible contact pressures at the driving side as well as at the driven side of the transmission, that is, contact pressures of the conical disks which are just sufficient to balance the spreading forces which are exerted by the transmitting element upon these disks and are responsive to the particular load acting upon the transmission and also to the speed ratio to which the transmission is adjusted at the particular time. By means of the invention, an excessive contact pressure of the conical disks upon the transmitting element is therefore avoided at any speed ratio to which the transmission is adjustable, which was impossible in the known transmissions in which the contact pressures were produced entirely hydraulically. Consequently, any of the transmissions according to the invention will remain properly operative for a much greater length of time, especially also in cases in which they are used for transmitting very high powers or are subjected to very high stresses. The means according to the invention for producing hydraulic contact pressures which are load-responsive as well as speed-ratio responsive also have the considerable advantage of being a very simple construction and of rendering the new transmissions considerably less expensive than the known transmissions in which the contact pressures were produced by mechanical pressure-producing means so as to be also responsive to the speed ratio of the transmission.

Finally, the invention has the advantage that the contact pressures at the driving and driven sides of the transmission may be produced independently of each other so that it is no longer necessary as in previous transmissions of this type to wait for a change of the contact pressure of the conical disks at one side of the transmission before any change of the contact pressure can occur at the other side.

BRIEF DESCRIPTION OF THE DRAWINGS

These and additional features and advantages of the present invention will become further apparent from the following detailed description thereof which is to be read with reference to the accompanying drawings which show several embodiments of the new infinitely variable cone pulley transmission largely in cross section and partly diagrammatically simplified. In the drawings.

FIG. 2 shows an enlarged view of one of the pressure-control valves as shown in FIG. 1;

FIG. 3 shows a cross section which is taken along the line III-III of FIG. 2;

FIG. 4 shows a cross section which is taken along the line IV-IV of FIG. 5 and shows an enlarged view of a pressure control valve according to a modification of the invention;

FIG. 5 shows a cross section which is taken along the line V-V of FIG. 4;

FIG. 6 shows a plan view of one of the elements as shown in FIGS. 4 and 5;

FIG. 11 shows a second embodiment of the transmission according to the invention in which the contact pressures are produced in response to the load upon the transmission and in response to its speed ratio; while

For an easier understanding and comparison of the different embodiments of the invention, all those parts of these embodiments which carry out similar functions are designated in the drawings and are referred to in the following description by the same reference numerals.

DESCRIPTION OF THE PREFERRED EMBODIMENTS

Figure 1:
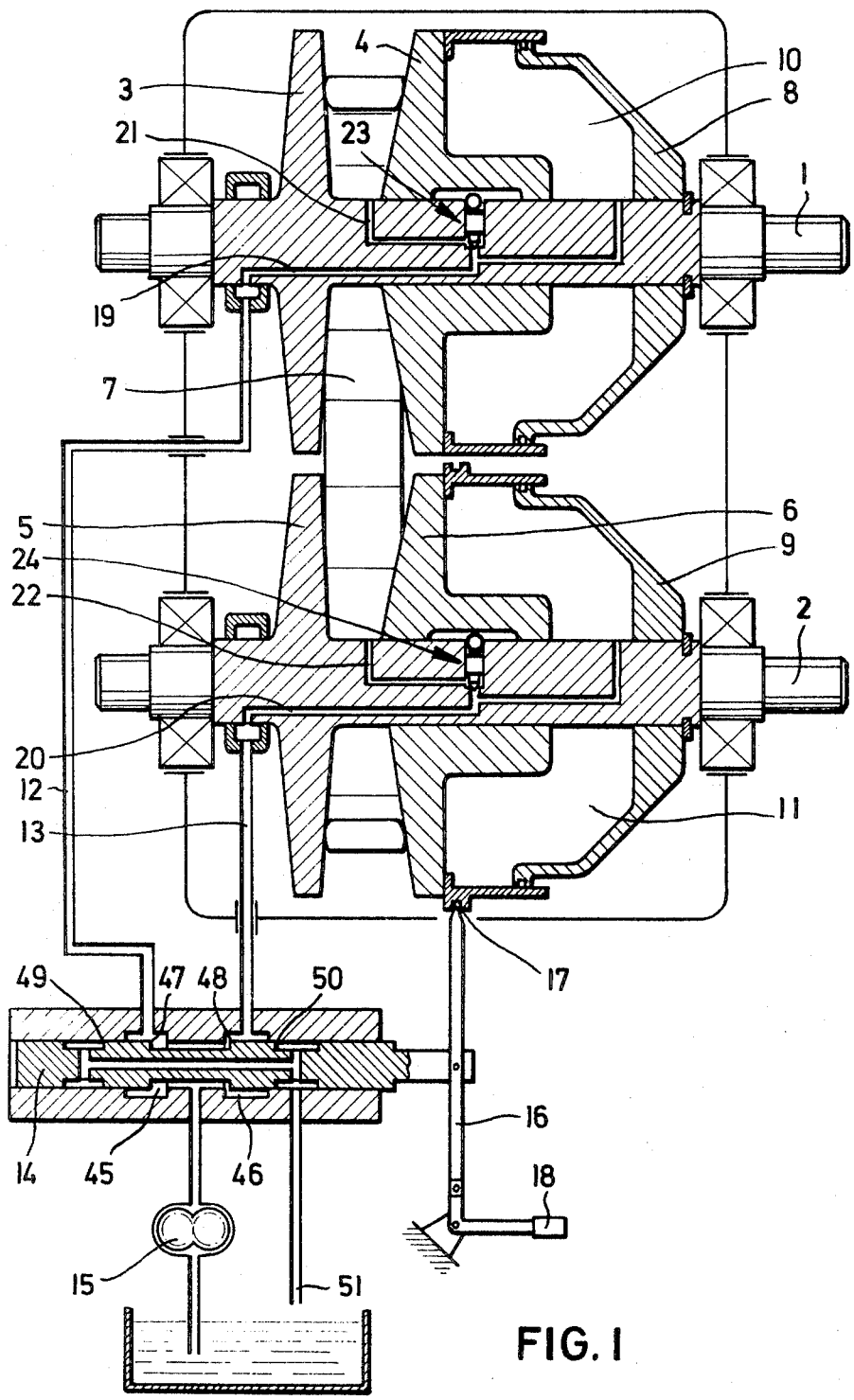
FIG. 1 shows a first embodiment of the transmission according to the invention in which the contact pressures are produced in response to the load upon the transmission and in response to its speed ratio.

The transmission as illustrated in FIG. 1 is provided with a drive shaft 1 and a driven shaft 2. Drive shaft 1 carries a pair of conical disks 3 and 4 and the drive shaft 2 a pair of conical disks 5 and 6. These two pairs of conical disks are connected by an endless transmitting element 7 such as a belt or chain. Disks 3 and 5 are rigidly secured to shafts 1 and 2, while disks 4 and 6 are provided in the form of hydraulic cylinders which are axially slidable along the two shafts and relative to their pistons 8 and 9 which are rigidly secured to these shafts so that a pressure chamber 10 is formed between the conical disk 4 and piston 8 and another pressure chamber 11 between the conical disk 6 and piston 9. These pressure chambers 10 and 11 may be supplied with oil under pressure through the conduits 12 and 13 so as to produce in these chambers the hydraulic pressures for applying the conical disks 4 and 6 with the required contact pressures against the transmitting element 7.

Conduits 12 and 13 are connected to a distributing slide valve 14 which distributes the oil which is supplied thereto by a pump 15 to the conduits 12 and 13 in accordance with the particular position to which this valve is adjusted. The adjustment of slide valve 14 may be effected by a control lever 16 which is pivotably connected thereto and one end of which engages into a peripheral groove 17 in the outer surface of the conical disk 6 for the purpose of maintaining the speed ratio of the transmission, while the other end of control lever 16 is adjustable by a hand lever 18 for arbitrarily varying the speed ratio of the transmission.

Conduit 12 is connected with pressure chamber 10 by a bore 19 in shaft 1 and conduit 13 with pressure chamber 11 by a bore 20 in shaft 2. Each of these bores 19 and 20 extends substantially parallel to the axis of shaft 1 or 2, respectively, and its inner end is connected with another channel 21 or 22 in the respective shaft and with a pressure control valve 23 or 24, respectively, which is likewise provided in the respective shaft 1 or 2.

FIGS. 2 and 3 show one of these pressure control valves very enlarged so as to reveal its details more clearly. The inner end of each bore 19 and 20 forms a throttling passage in which the oil flowing from bore 19 or 20 to channel 21 or 22 in shaft 1 or 2, respectively, may be throttled by the conical end of a valve member 25 which is slidable in a radial bore 26 of the shaft. Valve member 25 is connected by a compression spring 27 to a ball 28 which, in turn, engages upon inclined surfaces 29 and 30 which extend parallel to the axis of shaft 1 or 2 in the hub 31 of the axially movable conical disk 4 or 6, respectively. These inclining surfaces 29 and 30 may be designed, for example, so as to extend at different angles to the radius of shaft 1 or 2 which intersects the vertex of these surfaces and the inclination of surfaces 29 and 30 also changes in their axial direction. The purpose of the particular shape of these surfaces 29 and 30 will become clearly apparent from the subsequent description of the manner of operation of the transmission as illustrated in FIG. 1.

Let us assume that shaft 1 is driven at a constant speed, for example, by an electric motor, and that the transmission is in a state of balance in which the speed ratio to which it is adjusted does not tend to change. When the transmission is in this condition one-half of the torque to which shaft 1 is subjected will be transmitted to the transmitting element 7 by the conical disk 3 and the other half by ball 28 through the conical disk 4. At the other side of the transmission, one-half of the torque will likewise be transmitted to shaft 2 by the conical disk 5 and the other half by the conical disk 28 associated with valve 22 and ball 6. This torque transmission has the effect that because of the steeper inclined surface 29 in the conical disk 6 on the driven shaft 2, ball 28 will be pressed into the bore 26 against the action of spring 27 in accordance with the size of the torque component which is to be transmitted thereby with the result that the flow of oil passing through bore 20 into the channel 22 will be throttled by valve member 25 of valve 24 to such an extent that chamber 11 will contain just the hydraulic pressure which is required for balancing the spreading force which is exerted by the transmitting element 7 upon the conical disks 3 and 4 at the driven side of the transmission.

The inclined surface 30 in the conical disk 6 on the driving shaft 1 is made of such an inclination that the throttle valve 23 will always be closed. Consequently, the hydraulic pressure which acts at the driving side of the transmission is determined by slide valve 14 since the transmission can be in a state of balance only at a speed ratio in which slide valve 14 in operative association with the control lever 16 and the setting of the speed ratio by the end of control lever 16 in the peripheral groove 17 supplies pressure chamber 10 at the driving side with the hydraulic pressure which is necessary for balancing the spreading force which is exerted by the transmitting element 7 upon the conical disks 3 and 4.

If the speed ratio is to be changed so that the driven shaft 2 will run at a higher speed, this may be effected by pivoting the hand lever 18 in the counterclockwise direction. Slide valve 14 is thereby shifted so as to supply a higher hydraulic pressure to conduit 12 and thus to chamber 10, while the flow of oil into conduit 13 is throttled so that disk 4 will be moved toward and disk 6 away from the transmitting element 7. These movements are stopped when disk 6 taking along the control lever 16 by its peripheral groove 17 has again reversed the arbitrary adjustments of slide valve 14 which was made by means of the hand lever 18 to such an extent that, due to the pressures which are then supplied to the conduits 12 and 13 in association with the throttling of the return flow of the oil by means of the pressure control valve 24, the transmission is in a state of balance, that is in the condition in which the hydraulic pressures which are then contained in chambers 10 and 11 will again just suffice to balance the spreading forces which are exerted by the transmitting element 7 upon the two pairs of conical disks.

Such a change of the speed ratio of the transmission, however, also causes the ratio between the spreading forces to which are exerted upon the transmitting element 7 at the driving and driven sides of the transmission would be changed. In order to insure that this fact will also be considered in generating the hydraulic pressures which are required in chambers 10 and 11 for balancing the spreading forces of the transmitting element 7, the degree of inclination of the surfaces 29 and 30 along their axial direction varies in a manner so as to comply with this law of infinitely variable cone pulley transmissions. This has the result that the sizes of the contact pressures which are exerted by the conical disks 3 to 6 upon the transmitting element 7 are dependent not only upon the torque which is to be transmitted at the driving and driven sides of the transmission, that is, upon the load acting on the transmission, but also upon the speed ratio position to which the transmission is adjusted at the particular time. By suitably designing the inclined surfaces 29 and 30 it is possible to make the contact pressures of such sizes that they will not be excessive on either side of the transmission. Therefore the contact pressures which are exerted by the conical disks upon the transmitting element 7 will always have only just the strength to prevent the transmitting element 7 from slipping between the conical disks.

If the direction of the torque changes in the transmission as illustrated in FIG. 1, so that shaft 2 becomes the driving shaft and shaft 1 the driven shaft, for example, because the motor which is connected to shaft 1 is to be operated as a generator, the sizes of the spreading forces which are exerted by the transmitting element 7 upon the conical disks are also reversed since this element 7 then exerts a greater spreading force upon the conical disks 5 and 6 than upon the disks 3 and 4. Such a reversal which also requires a corresponding reversal of the hydraulic pressures in chambers 10 and 11 is carried out automatically by pressure control valves as illustrated in FIGS. 2 and 3 since due to the change of the direction of the torque, the inclined surfaces which act at the driving and driven sides of the transmission upon the balls 28 also change so that the less inclined surface 30 now engages upon ball 28 on shaft 2 and the steeper surface 29 upon the ball 28 on shaft 1.

In addition, such a reversal of the direction of the torque also results in a small variation of the speed ratio of the transmission because slide valve 14 then determines the hydraulic pressure which is contained in chamber 11 which means that, when the transmission is in the balanced condition, slide valve 14 will be shifted toward the right of its neutral position. However, because of the very steep characteristic of slide valve 14, even very small changes of the speed ratio will already result in strong control impulses so that the variation of the speed ratio which occurs at a reversal of the direction of the torque will be negligably small.

When employing pressure control valves with differently inclined surfaces 29 and 30, the transmission will therefore operate properly when the torque extends in either direction. However, if a change of the direction of rotation occurs, the contact pressures will no longer have the proper sizes since the resulting change of the inclined surfaces which act upon the balls 28 would then reverse the hydraulic pressures relative to each other which act in chamber 10 and 11 even though shaft 1 continues to be the drive shaft and shaft 2 the driven shaft.

It is, however, very easily possible to adapt the pressure control valves as shown in FIGS. 2 and 3 to such conditions, that is, to apply them properly to transmissions in which a change of the direction of the torque and a change in the direction of rotation may be expected. It is for this purpose only necessary to make both inclined surfaces of each pressure control valve 23 and 24 at the driving and driven sides of the transmission of the same inclination relative to the radius of the respective shaft which intersects the vertex between each pair of these inclined surfaces. The pressure control valve at the driving side of the transmission then determines the hydraulic pressure which is produced in the pressure chamber at this side by allowing suitable amounts of oil to flow off, while the pressure control valve at the driven side of the transmission will be closed so that the hydraulic pressure which is contained in the pressure chamber at the driven side will be determined by the slide valve 14.

FIGS. 4 to 6 illustrate another embodiment of the pressure control valve according to the invention which is designed so as to carry out the same functions as the pressure control valve as previously described. Also, in this case each shaft 1 and 2 is provided with a radial bore 26 in which a valve member 25 with a conical tip is slidable which is adapted to throttle the flow of oil which is supplied through bore 19 or 20 and then passes into the channel 21 or 22. This throttling effect occurs to an extent which depends upon the force with which ball 28 presses the compression spring 27 upon the respective valve member 25.

This force is generated by a lever 35 which is inserted into a groove 36 which is provided in the wall of the bore in the hub 37 of disk 4 or 6 through which shaft 1 or 2 extends, and lever 35 extends substantially parallel to the axis of this bore and shaft. One end of this lever 35 is pivotably mounted on a pin 39 which extends radially into the shaft 1 or 2, and lever 35 is provided with a longitudinal slot 40 into which a pin 41 engages which projects radially inwards from the wall of hub 37. The other end of lever 35 is provided with two inclined surfaces 42 and 43 which may have the same inclination or different inclinations to the radius of shaft 1 or 2 which intersects the vertex between these two inclined surfaces which hold the ball 28 between them.

If in the transmission as illustrated in FIG. 1 which is provided with the modified pressure control valves according to FIGS. 4 to 6 a torque is transmitted between shaft 1 or 2 and the associated hub 37, a small relative movement occurs in the peripheral direction between the respective shaft and the associated hub whereby pin 41 pivots the lever 35 about pin 39 until one of the inclined surfaces 42 or 43 presses against the valve ball 28 and thereby stops the pivoting movement and also produces at the same time a radial force upon ball 25 which has a size corresponding to the size of the torque which is to be transmitted between shaft 1 or 2 and hub 37. If the surfaces 42 and 43 have the same angle of inclination, this radial force causes the pressure control valve to be closed at the side of the transmission which is then driven, while the pressure control valve at the driving side of the transmission throttles the flow of oil from the bore 19 or 20 to the channel 21 or 22, respectively, so that the hydraulic pressure in the pressure chamber at the driving side of the transmission will have the strength which is required for balancing the spreading force which is exerted by the transmitting element upon the conical disks of the driving side. Therefore the respective pressure control valve which is in operation produces load-responsive contact pressures at that side of the transmission where this valve is located.

The responsiveness of the contact pressures to the speed ratio is attained as the result of the relative axial movement which occurs between shaft 1 or 2 and the associated flange 37 when the speed ratio changes. This relative movement causes a change of the leverages between pin 39 and pin 41 on the one hand and between the point of engagement of ball 28 with one of the inclined surfaces 42 or 44 and pin 41 on the other hand. This has the result that when a certain torque is transmitted between shaft 1 or 2 and hub 37, different radial forces are exerted upon the valve ball 25 depending upon the relative axial position of the shaft and hub to each other and that therefore different radial forces are exerted upon the valve ball 25 depending upon the particular speed ratio to which the transmission is adjusted. While the pressure control valve at the driven side of the transmission is also always held in the closed position by these different radial forces, the radical forces which change together with the speed ratio produce by means of the pressure valve at the driving side of the transmission in cooperation with the slide valve 14 a change of the pressure ratio between the contact pressures at the driving and driven sides together with a change of the speed ratio of the transmission. The different contact pressures which are required at the different speed ratios may be structurally attained by making the mentioned leverages of suitable sizes.

In the event that a cone pulley transmission according to the invention should be capable of producing the best possible contact pressures only when the direction of the torque changes but not also when the direction of rotation changes, the inclined surfaces 42 and 43 of the pressure control valve according to FIGS. 4 to 6 may, of course, be inclined at different angles just like the surfaces 29 and 30 of the pressure control valve according to FIGS. 2 and 3.

The compression spring 27 of the pressure control valve according to FIGS. 2 and 3 or according to FIGS. 4 to 6, which should maintain a certain minimum pressure in chambers 10 and 11 even when the transmission is not in operation or is not running under a load so that the transmitting element 7 will not have a slack between the two pairs of conical disks 3,4 and 5,6 preferably consists of cup springs which permit the stroke of the spring, which occurs when different radial forces are transmitted to the valve member 25, to be made as short as possible so that the relative movement in the peripheral direction between shaft 1 or 2 and hub 31 or 37, respectively, which is required for producing this radial force may be made as small as possible.

The slide valve 14 which is employed in the transmission according to FIG. 1 is provided with four control edges 47 to 50, and its housing is provided with a pair of annular chambers 45 and 46. Each of these chambers 45 and 46 is associated with one side of the transmission and each chamber is associated with a control edge 47 or 48, respectively, for controlling the supply of the oil under pressure and with a control edge 49 or 50, respectively, for controlling the return flow of the oil. The control edges 47 and 48 are spaced at such a distance from each other that, when slide valve 14 is in its neutral position, the valve ports in the valve housing leading to the conduits 12 and 13 are equally opened. The two outer control edges 49 and 50 are, however, located in such positions that, when the slide valve is in the mentioned neutral position, the return flow of the oil toward the return line 57 is shut off by each of these edges and will not start until the associated inner control edge 47 or 48 has shut off the oil supply to the conduit 12 or 13, respectively.

A slide valve of this design has the effect that the amounts of oil which are supplied by the pump 15 can never flow back directly to the return line 51 via the control edges 47 and 49 or 48 and 50, respectively. A direct flow of the oil can always occur only through the pressure control valve 23 or 24 on the driving or driven side of the transmission. The return flow of the oil from one of the chambers 10 or 11 via the control edge 49 or 50 after the oil supply has previously been stopped by the control edge 47 or 48 cannot occur until by an actuation of hand lever 18 a considerable variation of the speed ratio has been effected and thereby also a corresponding variation of the quantities of oil which are contained in the pressure chambers 10 and 11.

It is especially of advantage to employ the slide valve 14 in any of those cases in which only a relatively small amount of oil can be supplied within a certain period of time by means of the pump 15 or by any other source of oil under pressure so that only a weak current of oil under pressure can be maintained.

Figure 7:
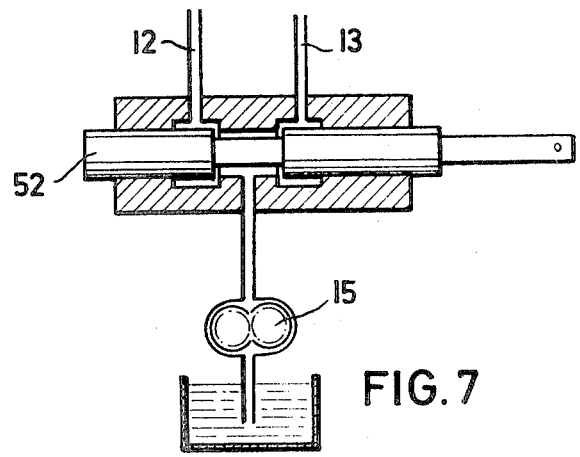
FIG. 7 shows a slide valve with two control edges.

If, however, larger amounts of oil may be supplied within the same period, it is possible to employ a more simple slide valve with two control edges like the slide valve 52 as illustrated in FIG. 7 in place of the slid valve 14 according to FIG. 1. This substitution of the slide valve will not vary the mode of operation of the transmission according to the invention when it is in a balanced position under load. Only if the transmission is adjusted by the hand lever to a speed ratio very different from the previous ratio, this substitution has the result that one of the conduits 12 or 13 will be closed by the slide valve 52 even though the latter does not permit the return flow of the amount of oil which is to be discharged from one of the pressure chambers 10 or 11 when the speed ratio changes.

In order to permit the amounts of oil which are to be discharged from one of the pressure chambers to flow back to the oil pump or the like even though a slide valve as shown in FIG. 7 is employed, the transmission as illustrated in FIG. 1 is to be provided for each of the hydraulic circuits which are supplied with oil through the conduits 12 and 13 with an oil outlet opening (not shown) through which the relatively large amounts of oil which were distributed by slide valve 52 to the conduits 12 and 13 may flow off continuously. If the speed ratio of the transmission is considerably changed, the amount of oil which is then to be expelled from one of the pressure chambers may flow off through the outlet opening which is associated with this chamber.

Figure 8:
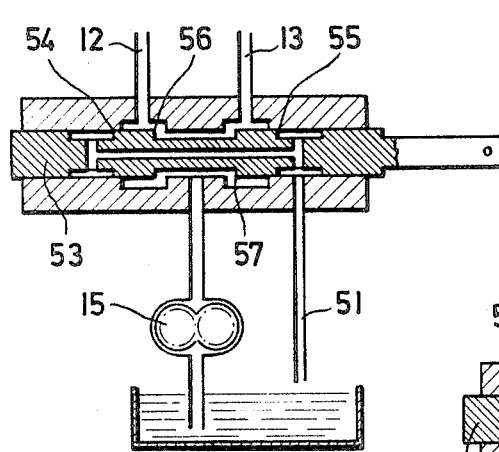
FIGS. 8 and 9 show a slide valve with four control edges in two different operating positions.
Figure 9:
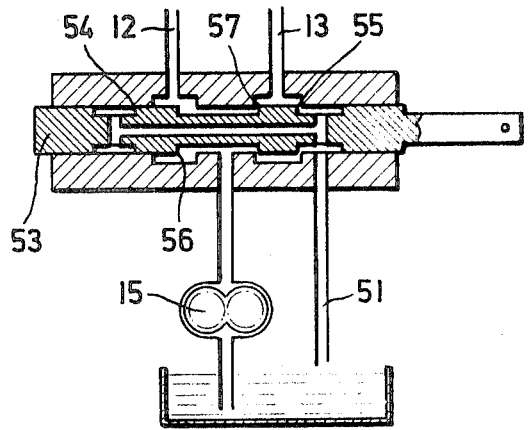

FIGS. 8 and 9 illustrate another embodiment of a slide valve 54 with four control edges which may be employed for the operation of the transmission as shown in FIG. 1. This slide valve 53 differs from the slide valve 14 as shown in FIG. 1 merely by the fact that each of the outer control edges 54 and 55 permits the return flow of the oil to the return line 51 already before the associate inner control edge 56 or 57 has shut off the oil supply. Thus, if slide valve 53 is in the corresponding position, a part of the amount of oil which is supplied by pump 15 to the hydraulic circuits may flow off continuously to the return line 51.

The slide valve 53 with four control edges as shown in FIGS. 8 and 9 is therefore especially suitable for being employed in an infinitely variable cone pulley transmission for the operation of which larger amounts of oil under pressure are available and which is designed for transmitting power in both directions of the torque and in both directions of rotation, that is, a transmission in which the pressure control valve of the side of the transmission which is then the driving side is more or less opened. When such a transmission is in a balance position, slide valve 53 will be in the position as shown in FIG. 9, provided the conduit 12 then leads to the driving side and conduit 13 to the driven side of the transmission. One part of the oil which is supplied by the pump 15 then flows through conduit 12 and the pressure control valve of the driving side which produces the hydraulic contact pressure which is required at that side, while the other part of the oil which is supplied by pump 15 flows off to the return line 51 via the control edges 57 and 55 which also determine the hydraulic pressure which is required at the driven side of the transmission. Since a current of oil under pressure flows continuously both at the driving side of the transmission through the pressure control valve and also at its driven side via the control edges 55 and 57, a very reliable and very sensitive generation of pressure is insured for the pressure chambers of both sides of the transmission.

Figure 10:
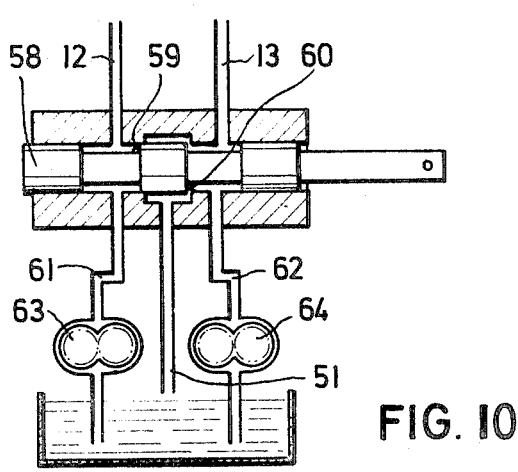
FIG. 10 shows another embodiment of a slide valve with two control edges.

For the operation of a transmission as illustrated in FIG. 1 which permits the power to be transmitted alternately in either of the directions of the torque and also in either of the directions of rotation, that is, a transmission in which the pressure control valve which is located at the side of the transmission which then forms its driving side is more or less opened it is also possible to employ a slide valve 58 with two control edges as illustrated in FIG. 10, the control edges 59 or 60 of which permits a throttled return flow of the oil to the return line 51 from the particular side of the transmission which is then the driven side. At the outer sides of the control edges 59 and 60 this slide valve 58 is supplied with oil by two pumps 63 and 64 or by one pump with a subsequent flow distributor and through two separate pressure lines 61 and 62 each of which is provided for one side of the transmission.

As illustrated in FIG. 10, conduit 12 leads to the driving side and conduit 13 to the driven side of the transmission. The oil current leading to the driving side passes through the pressure control valve 23 at that side, while at the driven side a continuous return flow of oil occurs past the control edge 60 which thus also determines the hydraulic pressure which prevails at the driven side of the transmission. As already described with reference to FIGS. 8 and 9, it is in this manner possible by means of the slide valve 58 according to FIG. 10 to produce the hydraulic pressures very reliably and sensitively which are required at both sides of the transmission.

Figure 11:
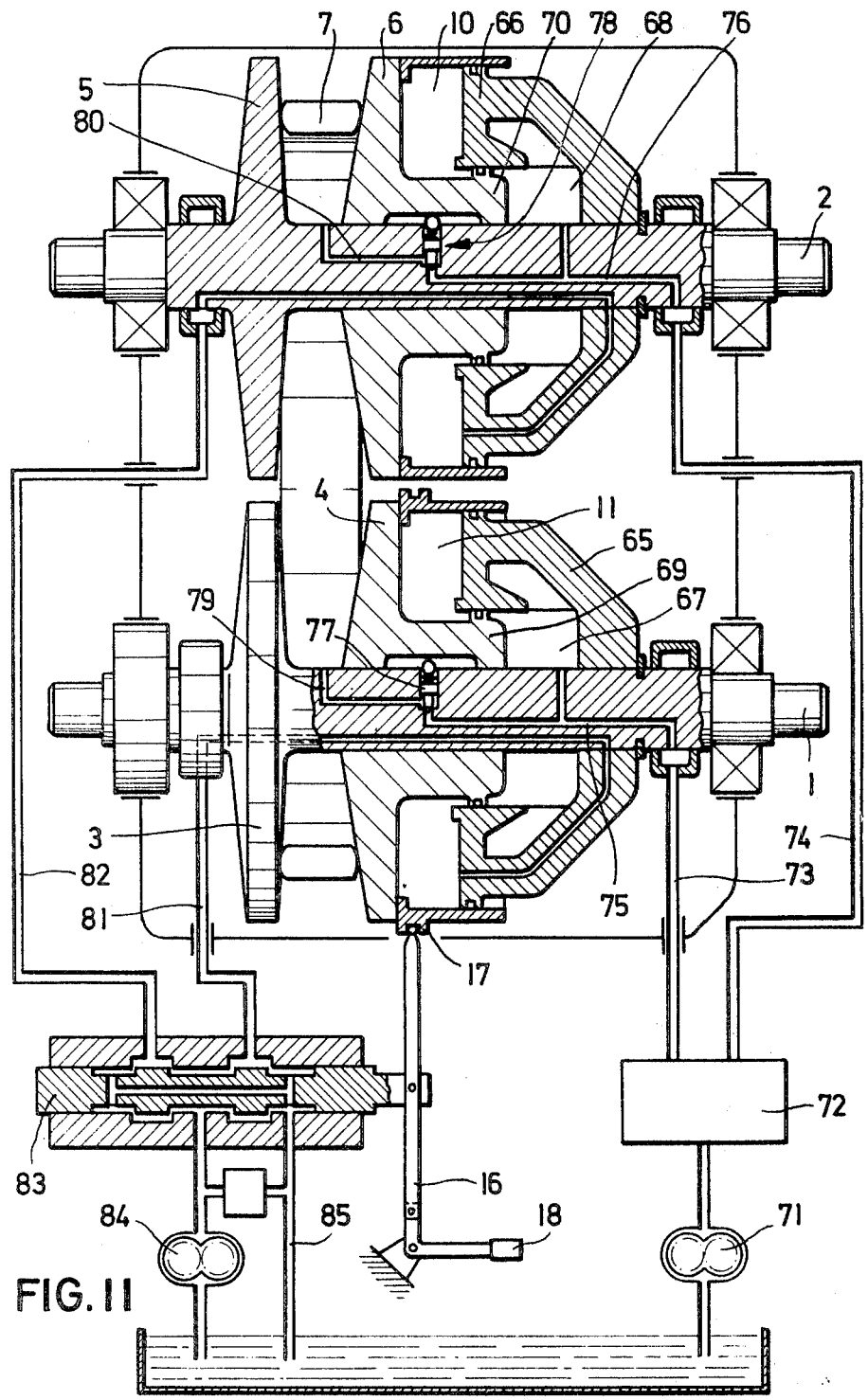

Another embodiment of the transmission according to the invention which differs in some respects both structurally as well as in operation from the transmission according to FIG. 1 is illustrated in FIG. 11, in which those parts which are similar to those in FIG. 1 and have already been described are identified by the same numerals as in FIG. 1. The pistons 65 and 66 for the pressure chambers 10 and 11 of the cylinders on disks 4 and 6 according to FIG. 11 are in this case designed so as also to form hydraulic cylinders containing pressure chambers 67 and 68 in which the hubs 69 and 70 of the axially slidable conical disks 4 and 6 are movable and serve as pistons for the pressure chambers 67 and 68.

By means of a pump 71 and a subsequent current distributor 72, oil is supplied under pressure separately through a conduit 73 and a bore 75 in shaft 1 to the pressure chamber 67 and through a conduit 74 and a bore in shaft 2 to the pressure chamber 68. From these bores 75 and 76 the oil also passes respectively to pressure control valves 77 and 78 and thence through channels 79 and 80 to the outside. Therefore, both pressure control valves 77 and 78 of this transmission operate simultaneously which means that both of them are more or less opened. Both pressure control valves thus provide contact pressures which are responsive to the load upon the transmission and to its speed ratio. As already described with reference to FIG. 1, the contact pressure of the conical disks upon the transmitting element will then be the best possible in the hydraulic chamber 10 or 11 either at the driving side or at the driven side of the transmission, while the amount of pressure which is still lacking from the best possible contact pressure in the hydraulic chamber at the other side of the transmission must be additionally produced for which purpose these chambers are respectively connected by conduits 81 and 82 to a distributing slide valve 83 which is provided with four control edges. This slide valve 83 distributes the oil which is supplied thereto under pressure by a pump 84 to the conduits 81 and 82, while the excessive amounts of oil may flow back to the suction side of pump 84 via one or the other outer control edge of slide valve 83 and conduct 85.

For maintaining and varying the speed ratio of the transmission as illustrated in FIG. 11, the same procedure is followed as described with reference to the transmission as shown in FIG. 1. If, after being adjusted to a certain speed ratio, the transmission according to FIG. 11 for any reason tends to change this speed ratio automatically, the resulting movement of the conical disk 4 is transmitted by its connection to the control lever 16 which shifts the slide valve 83 in such a manner that the adjusting movement of the speed ratio which has begun will be reversed and slide valve 83 will return to its balanced position which usually differs from its neutral position. If, however, the speed ratio is to be arbitrarily changed, the necessary actuation of the hand lever 18 results at first in a shifting movement of slide valve 83 whereby the pressure in chamber 10 and 11 is varied so as to effect the desired change of the speed ratio. This adjusting operation is stopped as soon as slide valve 83 has again reached its balanced position which corresponds to the balanced condition of the transmission.

Figure 12:
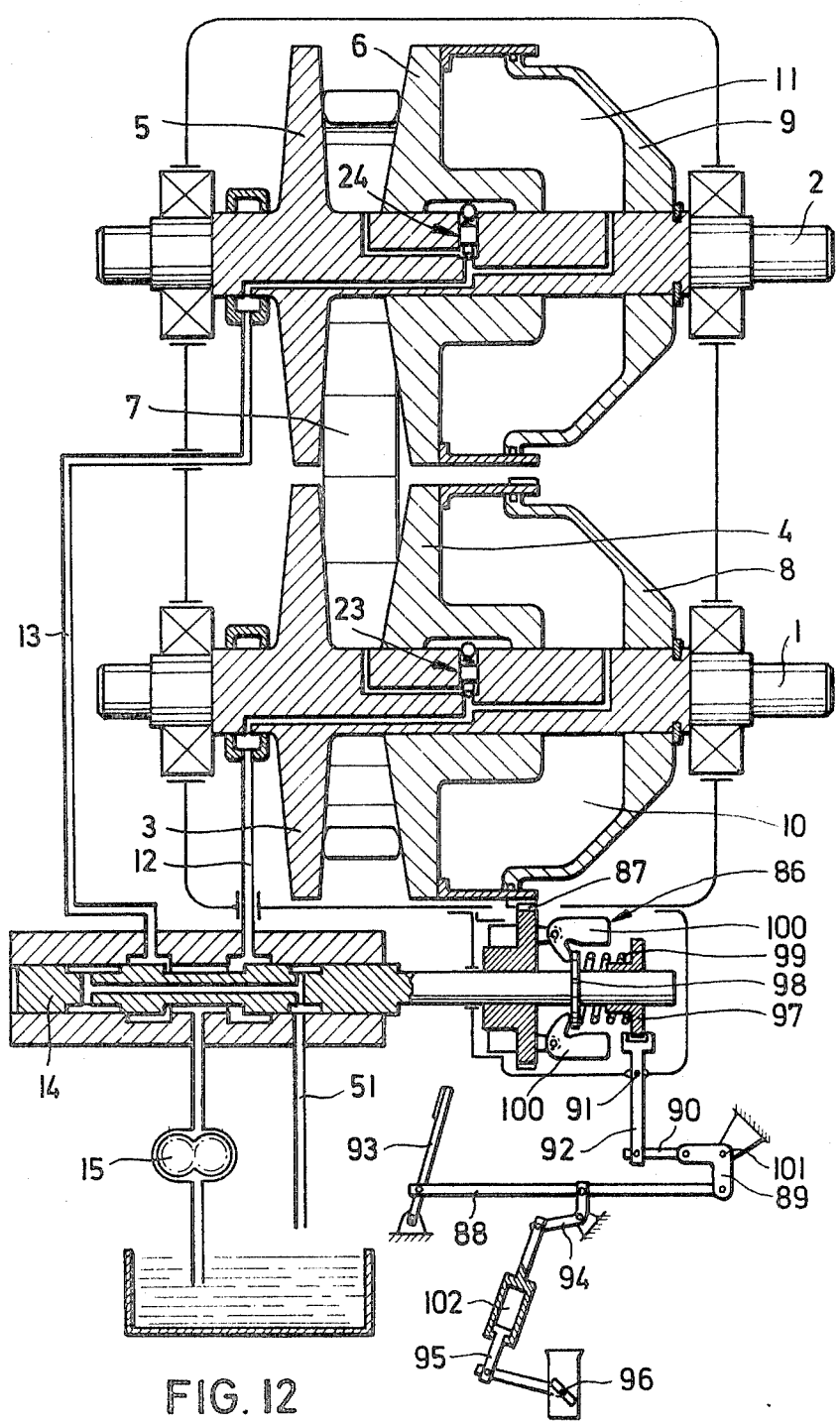
FIG. 12 shows a transmission similar to that according to FIG. 1, but modified for its employment in a motor vehicle.

FIG. 12 finally illustrates a modification of the transmission as shown in FIG. 1 which renders this transmission applicable for use in connection with a drive unit the power output and speed of which are variable, for example, the engine of a motor vehicle. Slide valve 14 is for this purpose connected to a speed governor 86 which, in turn is acted upon by the driving speed by being connected by associated gear teeth 87 to the conical disk 4, and may also be acted upon by the accelerator 93 of the engine which is connected to the governor by a rod 88, a bellcrank 89, a tie rod 90 and a two-armed lever 92 which is pivotably mounted at 91. By means of a bellcrank 94 and a connecting rod 95 which is divided into two sections which are axially movable relative to each other in a certain condition the accelerator 93 acts upon the choke 96 of the engine.

If the accelerator 93 is depressed from its neutral position, for example, for accelerating the vehicle, this movement is transmitted by the flange of a bushing 97 and a compression spring 99 to the flange 98 on the shaft of slide valve 14 which is thereby shifted for a small distance toward the left of the position as shown and thereby causes the hydraulic pressure to be increased in chamber 11 and reduced in chamber 10 so that, as the accelerator 93 is depressed, shaft 2 will run at a lower speed and shaft 1 at a higher speed. During this variation of the speed ratio, the axial movement of slide valve 14 will remain very small since, as the speed of shaft 1 increases, the speed of governor 86 will also increase so that the flyweight members 100 of this governor which also act upon flange 98 but against the action of spring 99 will largely reverse the previous adjustment of slide valve 14 which was effected by the accelerator 93.

If the accelerator 93 is not further depressed, the transmission will at first reach a state of balance and, as the speed of the vehicle then increases, it will then be adjusted so that shaft 2 will run at a higher speed since during the acceleration of the vehicle the engine continuously tends to increase its speed which leads through the flyweight members 100 to small shifting movements of slide valve 14 toward the right so that the hydraulic pressure increases in chamber 10 and decreases in chamber 11. This reverse adjustment is terminated at the moment when the power input of the transmission is consumed by the driving resistance of the vehicle so that the vehicle has no longer any tendency to accelerate.

A similar proceeding occurs when the driving resistance increases, for example, during an uphill drive. At such an increase of the driving resistance, the vehicle slows down when the output of the engine remains the same. Consequently, the speed of both shafts 1 and 2 decreases and the compressed spring 99 acting upon the flange 98 then tends to shift the slide valve 14 toward the left. This results in a change of the speed ratio and a reduction in speed of shaft 2 until the power input on shaft 1 is again equal to the power output required so that the vehicle no longer decelerates.

If the engine is to be used to decelerate the vehicle, this has at first the result that shaft 2 becomes the driving shaft and shaft 1 the driven shaft and that the transmitting element 7 therefore exerts a greater spreading force upon the conical disks 5 and 6 then upon the conical disks 3 and 4. However, since chamber 10 still contains at first a higher hydraulic pressure than chamber 11, the transmission is adjusted to reduce the speed of shaft 1. This adjustment occurs very quickly since for using the drag of the idling engine the accelerator is released which also causes the compression of spring 99 to be reduced whereby slide valve 14 will be shifted toward the left which further accelerates the above-mentioned adjustment. The transmission is thereby shifted to a speed ratio at which shaft 1 runs at the lowest speed so that the speed of the engine is also low and its braking effect is very small.

For attaining a higher braking effect of the engine, the accelerator 93 is designed to be retracted beyond its neutral position as illustrated, whereby a load condition will be simulated on the governor 86 even though the engine is not affected. This is due to the fact that, when the accelerator 93 is in its neutral position, the pivot points of tie rod 90 on belt crank 89 and on lever 92 are in straight alignment with the pivot point 101 of bellcrank 89 so that any pivoting movement of the accelerator either toward the right or toward the left from its neutral position will cause spring 99 to be compressed and slide valve 14 to be shifted toward the left. However, at a pivoting movement of the accelerator 93 toward the left beyond its neutral position, the device 102 will permit the upper section of the connecting rod 95 to shift toward its lower section so that the position of the choke 96 will not be affected.

Such a simulated load condition on the governor 86 therefore also causes slide valve 14 to be shifted toward the left of its neutral position so that the hydraulic pressure will be increased in chamber 11 and decreased in chamber 10 with the result that the conical disks 5 and 6 will move toward each other and disks 3 and 4 away from each other. The speed of shaft 1 and thus also of governor 86 then increases until, due to the return movement of slide valve 14 caused by the action of the flyweight members 100, the transmission has arrived at the speed ratio in which the braking power of the engine is applied upon shaft 1 maintains the vehicle at a constant speed.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An infinitely variable cone pulley transmission having driving and driven shafts, at least two pairs, each composed of first and second conical pulley discs, one pair on each of said shafts, at least one endless transmitting element connecting and running between said two pairs of conical pulley disks, wherein one disk of each pair on the driving and driven shafts is movable in the axial direction on its shaft relative to the other disk and forms a rotating hydraulic cylinder containing a piston rigidly connected to said shaft, and wherein hydraulic fluid supply means create solely the contact pressures with which the conical disks are applied against the transmitting element at both sides of the transmission in a manner so as to be automatically load-responsive, a control element for maintaining and varying the speed ratio of the transmission, said movable disks moving axially in response to variations in torque on the shafts, and a distributing slide valve acted upon by said control element and adapted to distribute the pressure fluid supplied to it from said supply means to the hydraulic cylinders, in which said supply means includes a pressure control valve, and means responsive to a change of the axial position of one of the axially movable disks for regulating said pressure control valve for controlling the hydraulic pressure so as to be load-responsive as well as responsive to the adjusted speed ratio of the transmission.

2. A transmission as defined in claim 1, having a compression spring acting on the pressure control valve continuously urging it to closed position.

3. A transmission as defined in claim 1, in which at least one shaft is provided with a first channel extending through the shaft substantially parallel to its axis forming part of the means for supplying the pressure chamber in the cylinder with hydraulic fluid, and with a second channel branching off through a connection from said first channel and leading to the outside; the pressure control valve being mounted in the shaft and adapted to throttle the connection between said two channels; the hub of the axially movable disk having in the wall of its bore at least one inclined surface, said torque-responsive means including an intermediate movable element partly projecting radially from the shaft and having an inner end acting through a compression spring upon the control valve, the outer end of said element engaging said inclined surface in the wall of the bore, said inclined surface extending substantially parallel to the axis of the shaft, said outer end of the element being acted upon by said inclined response to the load acting upon this side of the transmission; said inclined surface, for acting upon the pressure control valve in response to the varying speed ratio of the transmission having a varying angularity in its axial direction.

4. A transmission as defined in claim 3, in which said hub has two inclined surfaces, the outer end of the intermediate element being disposed between said surfaces, said inclined surfaces intersecting at a line forming a vertex extending parallel to the axis of the shaft and the inclined surfaces being disposed at equal angles to each radial plane of the shaft intersecting said vertex.

5. A transmission as defined in claim 3, in which said hub has two inclined surfaces, the outer end of the intermediate elements being between said surfaces, said inclined surfaces intersecting at a vertex extending parallel to the axis of said shaft, and the surfaces being disposed relative to each other at different angles to each radial plane of the shaft intersecting said vertex.

6. A transmission as defined in claim 3, in which the intermediate element comprises a ball.

7. A transmission as defined in claim 3, in which the slide valve is provided with four control edges, said fluid supply means include a fluid supply line and a fluid return line connected to said slide valve, said slide valve having two annular chambers each connected to one of said cylinders each annular chamber being associated with a pair of said control edges, the first edge of each said pair being adapted to control the supply of fluid to one of said cylinders and the second edge adapted to control the return flow of fluid to the return line; the two first edges of both pairs being axially spaced from each other at such a distance that, when the slide valve is in its central position, the fluid supply passages of said valve leading to the two cylinders are equally opened, while the fluid return passages to said return line are closed by said second control edges; and the axial distance between the first and second control edges of one pair which are associated with each annular chamber being smaller than the axial length of said annular chamber.

8. A transmission as defined in claim 3, in which the slide valve is provided with four control edges, said fluid supply means includes a fluid supply line and a fluid return line connected to said slide valve, said slide valve having two annular chambers each connected to one of said cylinders; each annular chamber being associated with a pair of said control edges, the first edge of each said pair being adapted to control the supply of fluid to one of said cylinders and the second edge adapted to control the return flow of fluid to the return line; the two first edges of both pairs being axially spaced from each other at such a distance that, when the slide valve is in its central position, the fluid supply passages of said valve leading to the two cylinders are equally opened, while the fluid return passages to said return line are closed by said second control edges; and the axial distance between the first and second control edges of one pair which are associated with each annular chamber being slightly larger than the axial length of said annular chamber.

9. A transmission as defined in claim 3, in which the slide valve is provided with two control edges and forms an adjustable flow distributor.

10. A transmission as defined in claim 3, in which said supply means includes separate means of equal pressure to supply fluid to each of said cylinders and a return line from each cylinder, one of said pressure control valves being provided in the supply means to each cylinder and said slide valve having two control edges and being adapted to control the return line from the cylinder on the side of the transmission then forming the driven side thereof.

11. A transmission as defined in claim 3, in which, for producing the load-responsive and speed ratio-responsive contact pressures, each axially movable disk has a second pressure chamber connected thereto on the opposite side of the piston from the first cylinder, a second hydraulic fluid supply means being provided comprising a source of oil under pressure and a flow distributor connected thereto; means connecting the flow distributor to the second pressure chamber of each disk; each second pressure chamber being formed by the piston and a hub on the associated axially movable disk which is axially movable within the second cylinder and acts therein as a movable piston; means connecting the second pressure chamber through the pressure control valve to the outside; the fluid supply means to the first pressure chamber including said slide valve, said slide valve having four control edges; excessive amounts of fluid flowing without pressure past the outer control edges of the slide valve.

12. A transmission as defined in claim 1, in which at least one shaft is provided with a first channel extending through the shaft substantially parallel to its axis forming part of the means for supplying the pressure chamber in the cylinder with pressure fluid, and with a second channel branching off through a connection from the first channel and leading to the outside; the pressure control valve being mounted in the shaft and adapted to throttle the connection between said two channels; said torque-responsive means including an intermediate movable element partly projecting radially from the shaft and having an inner end acting through a compression spring upon the control valve, the hub of the movable disk on said shaft having a recess therein facing the shaft and extending parallel to the axis thereof, a lever in said recess pivoted on said shaft about a radial axis thereof, said lever having an inclined surface extending substantially parallel to the axis of the shaft, the outer end of said element engaging said inclined surface, said outer end being adapted to be acted upon by this inclined surface in response to the load acting upon this side of the transmission; said lever having a longitudinal slot extending substantially parallel to the axis of said shaft; and a pin is secured to and projecting radially inwardly from the wall of said hub into said slot in said lever.

13. A transmission as defined in claim 1, in which the control element comprises a two-armed lever one end of which engages into a peripheral groove in the outer wall of one of the axially movable disks, while its other end is adjustable.

14. A transmission as defined in claim 1, in which the control element comprises a speed governor which is rotatable at a speed directly proportional to the speed of one of the axially movable conical disks and is also adjustable.